(12) United States Patent
Prater

(10) Patent No.: US 7,243,770 B2
(45) Date of Patent: Jul. 17, 2007

(54) CLUTCH ASSEMBLY INCLUDING STRENGTHENING MEMBERS

(75) Inventor: Ronald E. Prater, Rochester, MI (US)

(73) Assignee: Koppy Corporation, Orion, MI (US)

( * ) Notice: Subject to any disclaimer, the term of this patent is extended or adjusted under 35 U.S.C. 154(b) by 573 days.

(21) Appl. No.: 10/226,387

(22) Filed: Aug. 23, 2002

(65) Prior Publication Data
US 2004/0035667 A1  Feb. 26, 2004

(51) Int. Cl.
*F16D 13/52* (2006.01)
(52) U.S. Cl. ............ 192/70.2; 192/109; 192/112; 192/115
(58) Field of Classification Search ............. 192/70.2, 192/70.19; 29/893.34; 74/434
See application file for complete search history.

(56) References Cited

U.S. PATENT DOCUMENTS

| | | | | |
|---|---|---|---|---|
| 3,922,932 A | * | 12/1975 | Maurice et al. | 475/284 |
| 4,014,619 A | * | 3/1977 | Good et al. | 403/359.5 |
| 4,716,756 A | * | 1/1988 | Fujioka et al. | 72/353.4 |
| 4,813,522 A | * | 3/1989 | Fujioka et al. | 192/70.2 |
| 4,945,782 A | * | 8/1990 | Farrell | 74/431 |
| 5,069,575 A | * | 12/1991 | Anderson | 441/6 |
| 5,180,043 A | * | 1/1993 | Walker | 192/70.2 |
| 5,881,856 A | | 3/1999 | Prater | |
| 5,896,970 A | | 4/1999 | Prater | |
| 5,906,135 A | | 5/1999 | Prater | |
| 5,934,126 A | * | 8/1999 | Maruki et al. | 72/85 |
| 6,007,430 A | | 12/1999 | Prater | |
| 6,058,591 A | | 5/2000 | Prater | |

* cited by examiner

Primary Examiner—Saul Rodriguez
(74) Attorney, Agent, or Firm—Carlson, Gaskey & Olds

(57) ABSTRACT

A clutch housing assembly for use in vehicle drivelines includes at least one strengthening member at an open end of the housing. The strengthening member preferably is formed by cutting away portions of the housing near the open end and then deforming the remaining portions. The deformed portions preferably are folded over and against a surface of the housing near the open end. The strengthening members provide additional strength to the housing at the open end to resist deformations that may otherwise occur because of forces incident on the assembly during operation of the vehicle driveline.

13 Claims, 4 Drawing Sheets

CLUTCH ASSEMBLY INCLUDING STRENGTHENING MEMBERS

BACKGROUND OF THE INVENTION

This invention generally relates to an assembly for use in vehicle drivelines and more particularly to a clutch housing assembly.

Vehicle drivelines typically include an engine and a transmission having a plurality of gears that are selectively engaged while driving the vehicle. A clutch typically is utilized to selectively couple the engine to the transmission to transmit driving torque to the wheels of the vehicle. The clutch typically includes a plurality of clutch plates that are selectively engaged or disengaged depending on the desires for operating the vehicle. The clutch plates are typically housed within a single clutch housing.

The normal operating conditions for clutches typically result in forces that tend to urge the clutch plates outside of the clutch housing. While various approaches are used to maintain the clutch plates within the housing, sometimes the housing material itself may give way under the normal operating forces.

The possibility for the clutch housing to become deformed and inoperative is increased by the typical machining of the housing when providing a snap ring retaining groove, for example. It is not unusual to machine a clutch housing near an open end of the housing to facilitate maintaining the clutch plates in position. This machining often reduces the strength of the clutch housing near the open end. One attempt at strengthening the open end has been to add additional material near the open end of the housing. The difficulty with this approach, however, is that it is typically complex to complete and proves prohibitively expensive. The cost associated with such approaches typically is not justified in view of the limited strength benefits gained.

There is a need for an improved clutch housing assembly with better strength characteristics than has been previously available. Moreover, there is a need for an economical manner of achieving additional strength in a clutch housing assembly. This invention meets those needs while avoiding the shortcomings and drawbacks of prior attempts.

SUMMARY OF THE INVENTION

In general terms, this invention is a clutch housing assembly for use in a vehicle driveline. The clutch housing includes a first end that is generally open and a second end. The first end of the housing includes at least one folded over strengthening member.

In the preferred embodiment, the clutch housing includes a plurality of alternating splines and grooves. In one example, each of the splines includes a folded over strengthening member. In another example, each of the grooves includes a strengthening member.

This invention also includes a method of making a clutch assembly having at least one strengthening member at an open end. After a clutch housing blank is formed, at least a portion of the upper edge is deformed and folded back over itself to provide a strengthening member at the open end of the housing.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
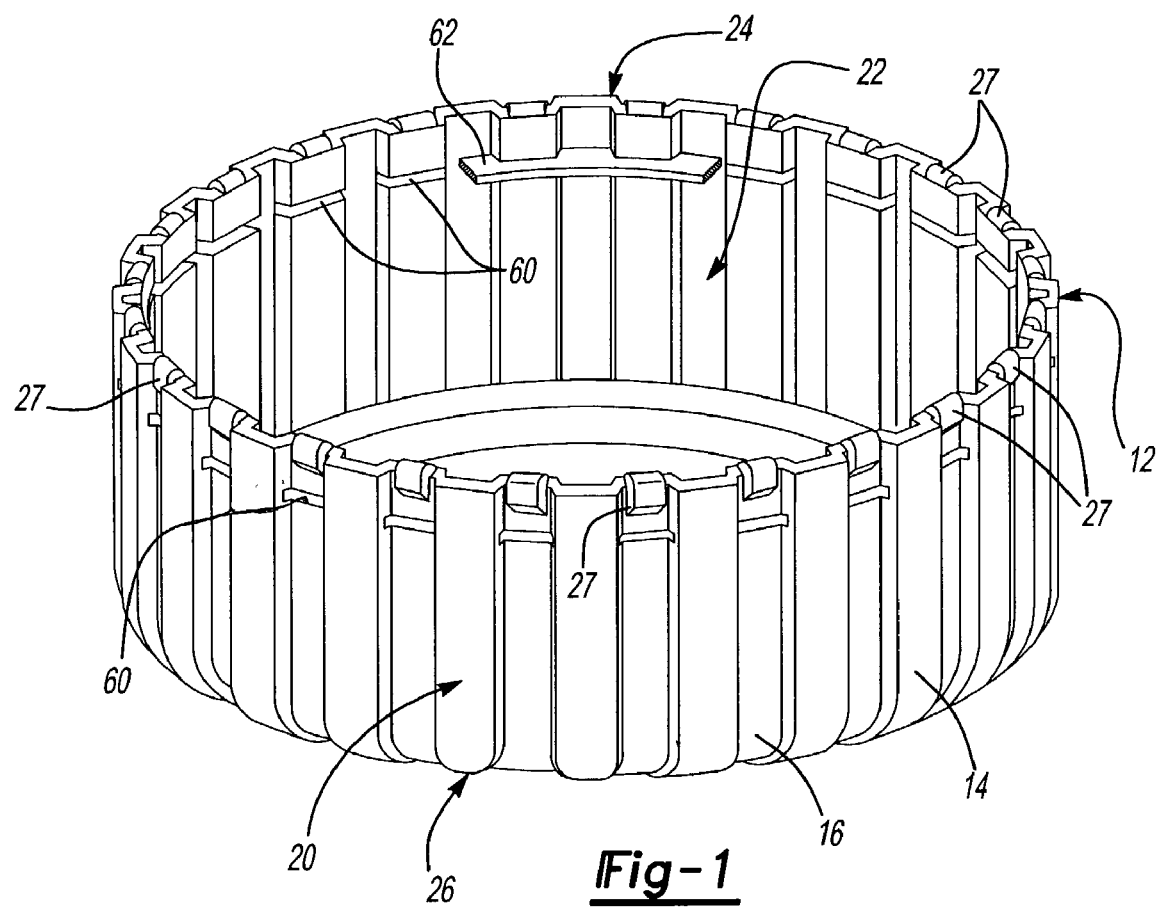
FIG. 1 is a perspective view of a clutch housing assembly designed according to this invention.

A clutch housing 12 has a generally cylindrical wall that includes a plurality of grooves 14 and splines 16. In the illustrated example, the splines and grooves are apparent on the outer surface 20 and the inner surface 22 of the generally cylindrical wall of the housing 12. In another example, the outer surface 20 is smooth and without the surface contour of the splines and grooves.

A first end 24 of the housing 12 is generally open while an opposite end 26 is generally closed as known in the art. The open end 24 includes at least one strengthening member 27. As will be described below, the strengthening member 27 includes a folded over portion of the clutch housing material at the open end 24. In the illustrated example, a strengthening member 27 is provided at the open end 24 on each of the splines 16.

Although a strengthening member 27 is illustrated on each of the splines in the example embodiment of FIG. 1, it is possible to use less strengthening members. Further, as those skilled in the art will appreciate after reading this description, it is possible to provide the strengthening members on the grooves rather than on the splines. Additionally, the entire edge at the open end of the housing may be formed according to this invention to provide a strengthening member around the entire periphery of the open end 24.

Figure 2C:
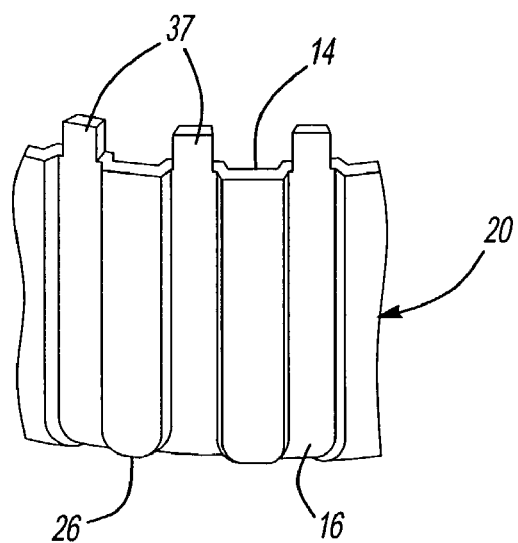
FIG. 2C is a perspective view of a portion of a clutch housing during an intermediate stage of the inventive method.
Figure 2A:
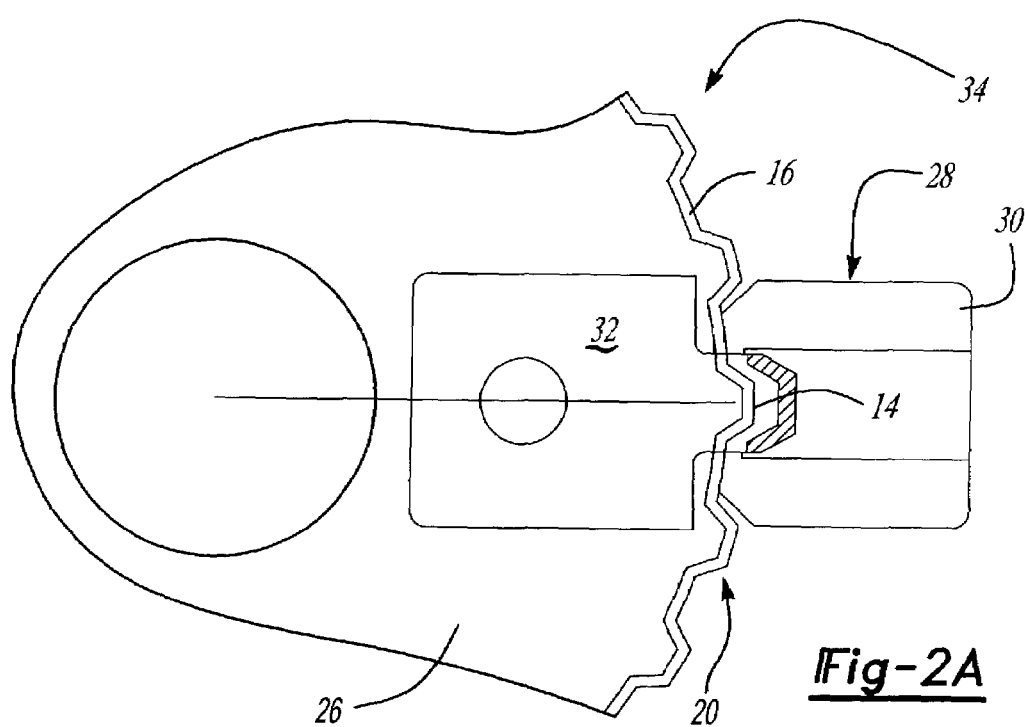
FIG. 2A is a partial view of a portion of the inventive method.
Figure 2B:
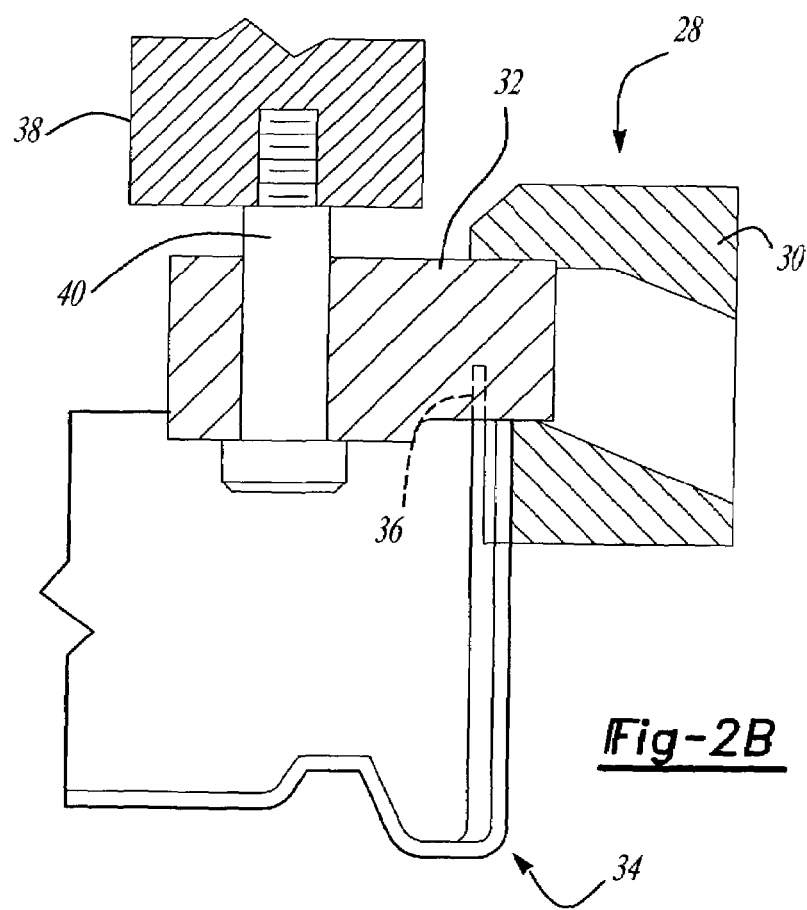
FIG. 2B is a partial side view of a later portion of the inventive method.

The preferred method of making the clutch housing assembly 12 includes forming a housing blank as known in the art. As seen in FIGS. 2A and 2B, selected portions of the housing are removed near the open end 24. In the illustrated example, a cutting tool arrangement 28 includes a support portion 30 and a cutting portion 32. With the tooling 28 appropriately positioned relative to the housing 12, the cutting portion 32 moves radially outward relative to the housing to remove a portion of the housing material, which is metal, adjacent the open end 24. In the illustrated example, a machine 38 is coupled to the cutting portion 32 of the tool through a fastener 40. The motion of the cutting tool 32 removes a portion 36 of the housing material.

In the illustrated example, a plurality of strengthening members 27 are eventually formed around the circumference of the housing 12. By appropriately indexing the tooling 28 around the circumference of the housing 12, a plurality of cut away portions 36 are removed. The example structure at an intermediate stage of the inventive method appears somewhat like as shown in FIG. 2C. In that illustration, the strengthening members 27 are not yet completely formed. The material from which the strengthening members are formed is shown at 37 in FIG. 2C.

Figure 3A:
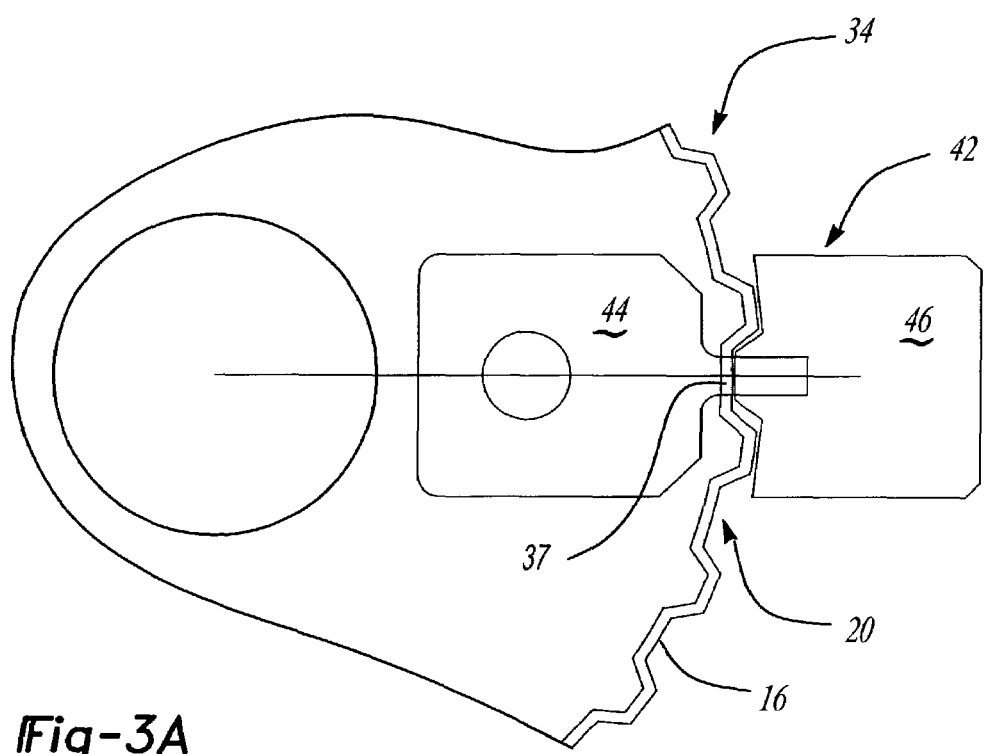
FIG. 3A is a partial top view of a later stage of the inventive method.
Figure 3B:
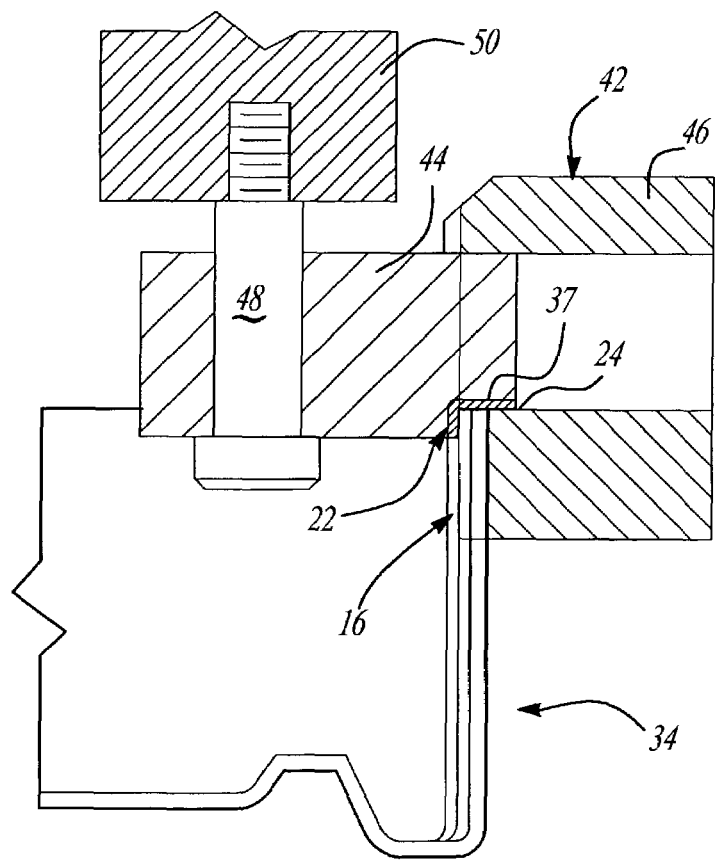
FIG. 3B is a side view of another stage of the inventive method.

After the cutting operation is complete, it is preferred to deform the portions of material 37 and to fold them over at the open end. This process is schematically shown in FIGS. 3A, 3B, 4A and 4B. A deformation tool 42 includes a moving portion 44 and a support portion 46. The moving portion 44 moves radially outward relative to the housing to move the portion of material 37 outward into the support portion 46 as shown in FIGS. 3A and 3B. The next preferred step is to then use a forming tool 52 to fold the portion of material 27 back over and against the outer surface 20 of the housing 12. In the illustrated example, the forming tool 52 moves in a downward direction (according to the arrow of FIG. 4B) to press the portion of material 37 against the outer surface of the housing at the open end.

Folding the material portions 37 over and inward against the inner housing surface 22 is another example way of providing strengthening members according to this invention.

Depending on the material, those skilled in the art who have the benefit of this description will be able to select tooling components and the conditions needed to form strengthening members as provided by this invention.

By folding over material at the open end 24 of the housing, the strength of the housing is increased. The additional, folded over material provides additional strength for resisting any deformation of the housing that may otherwise be caused by the normal operating forces on the clutch plates during vehicle operation.

Figure 4A:
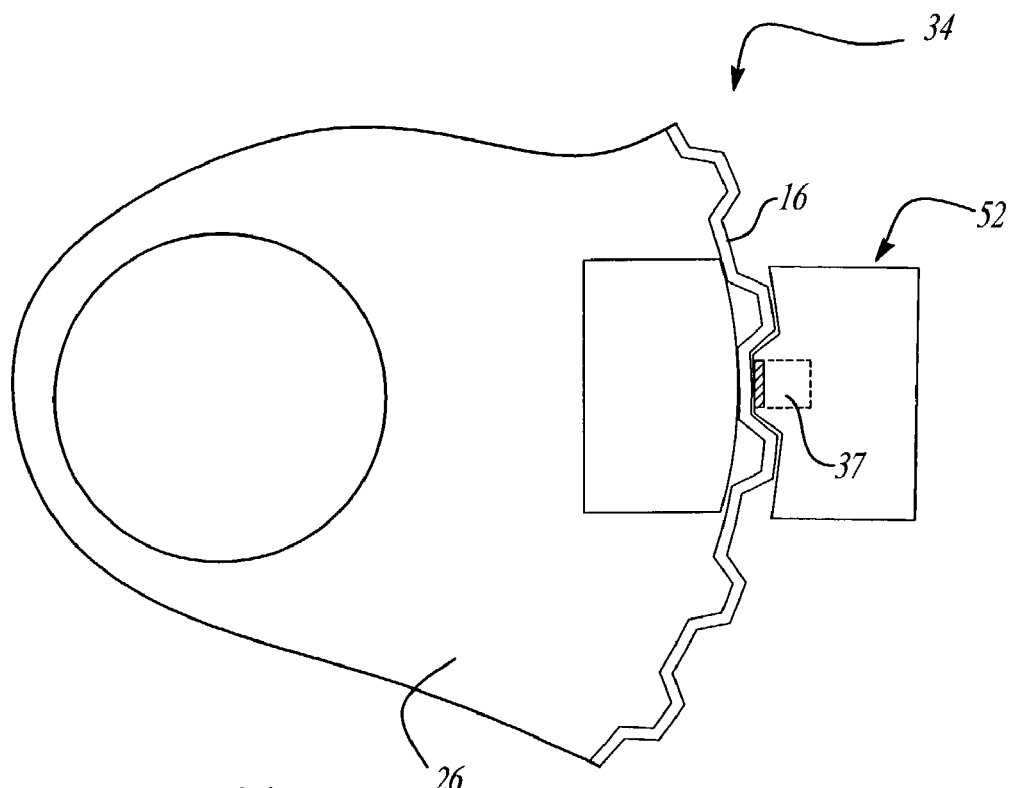
FIG. 4A is a top view of a final step in the inventive method.
Figure 4B:
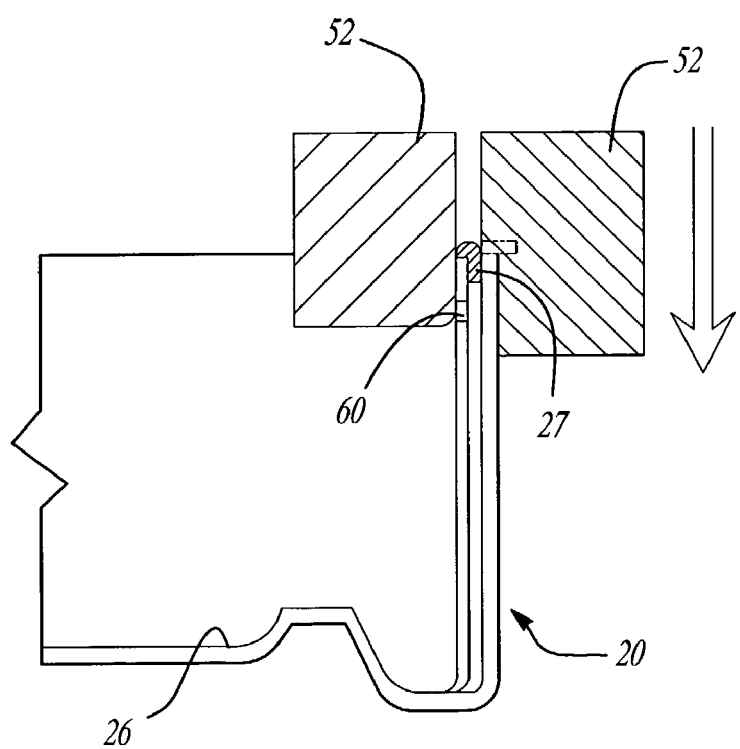
FIG. 4B is a partial side view of a final step in the method of this invention.

As can be appreciated from FIGS. 1 and 4B, the housing 12 preferably includes a snap ring groove 60 for holding a snap ring 62 on the housing near the open end 24. In the illustrated example, the snap ring groove preferably is formed by lancing openings through the splines 16 near the position of the ends of the strengthening members 27. Other positions for the snap ring and the snap ring groove are within the scope of this invention.

In one example, the lanced snap ring groove 60 is formed using the same tooling that is used to form the strengthening members 27. In another example, the snap ring groove 60 is formed using separate machinery after the strengthening tabs 27 are formed. Alternatively, the snap ring groove may be formed before the process of making the strengthening tabs.

This invention provides a strengthened clutch housing assembly that is economical to manufacture and reliable during operation. The preceding description of an example implementation of this invention is not intended to be limiting. Variations and modifications to the disclosed example may become apparent to those skilled in the art that do not necessarily depart from the purview and spirit of this invention. The scope of legal protection given to this invention can only be determined by studying the following claims.

I claim:

1. A housing for use as a vehicle driveline component, comprising:
   a sidewall establishing an open end of the housing, the sidewall having a plurality of spaced splines and a strengthening member near the open end that is formed of the sidewall material having a folded over portion that is at least partially aligned with and adjacent the sidewall, an inner surface of the sidewall near the open end extending continuously and uninterrupted once the strengthening member and establishing at least one surface of the strengthening member.

2. The housing of claim 1, including a plurality of the strengthening members.

3. The housing of claim 2, wherein at least some of the plurality of the strengthening members are aligned with the splines.

4. The housing of claim 2, wherein the plurality of strengthening members are spaced about a periphery of the open end.

5. The housing of claim 2, wherein the splines have an exposed surface at a first radial distance from a center of the housing and spaces between the splines have an exposed surface at a second radial distance from the center of the housing and wherein the folded over portion of each of the strengthening members is received at least partially against the exposed surface of the spaces.

6. The housing of claim 5, wherein an exposed surface of the strengthening members is at a radial distance from the center of the housing that is one of the first radial distance or the second radial distance.

7. The housing of claim 5, wherein the folded over portion of each of the strengthening members is nested between the splines.

8. The housing of claim 1, wherein the folded over portion of the strengthening member is adjacent an outer surface of the sidewall.

9. A housing for use as a vehicle driveline component, comprising:
   a sidewall establishing an open end of the housing, the sidewall having a first plurality of spaced splines projecting toward an interior of the housing and a second plurality of spaced splines projecting toward an exterior of the housing and a plurality of strengthening members near the open end that are extensions of at least some of one of the pluralities of splines, each strengthening member having a folded over portion that is at least partially aligned with and adjacent the sidewall and at least partially nested between corresponding adjacent ones of the other of the pluralities of splines.

10. The housing of claim 9, wherein an inner surface of the sidewall near the open end extends continuously and uninterrupted onto the strengthening member and establishes at least one surface of the strengthening member.

11. The housing of claim 9, wherein the strengthening members are extensions of the sidewall material forming the first plurality of splines and the folded over portions are at least partially nested between corresponding ones of the second plurality of splines.

12. The housing of claim 9, wherein the strengthening members are spaced about a periphery of the open end.

13. A housing for use as a vehicle driveline component, comprising:
   a side wall establishing an open end of the housing, the side wall having a plurality of spaced splines that have an exposed surface at a first radial distance from a center of the housing and spaces between the splines that have an exposed surface at a second radial distance from the center of the housing, and a plurality of strengthening members near the open end that are formed of the side wall material having a folded over portion that is received at least partially against the exposed surface of the spaces and is nested between the splines, and an inner surface of the side wall near the open end extending continuously and uninterrupted onto the strengthening members and establishing at least one surface of the strengthening members.

* * * * *

UNITED STATES PATENT AND TRADEMARK OFFICE
CERTIFICATE OF CORRECTION

PATENT NO.        : 7,243,770 B2                                           Page 1 of 1
APPLICATION NO.   : 10/226387
DATED             : July 17, 2007
INVENTOR(S)       : Prater It is certified that error appears in the above-identified patent and that said Letters Patent is hereby corrected as shown below:

Claim 1, Column 3, line 62: "once" should read as --onto--

Signed and Sealed this

Sixteenth Day of October, 2007

JON W. DUDAS
*Director of the United States Patent and Trademark Office*